United States Patent
Gozum et al.

(10) Patent No.: US 8,877,840 B2
(45) Date of Patent: Nov. 4, 2014

(54) SELF PRIMING SPACKLING COMPOUND

(71) Applicant: 3M Innovative Properties Company, St. Paul, MN (US)

(72) Inventors: John E. Gozum, Stillwater, MN (US); Hal A. LaFleur, III, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 113 days.

(21) Appl. No.: 13/742,574

(22) Filed: Jan. 16, 2013

(65) Prior Publication Data
US 2013/0190430 A1    Jul. 25, 2013

Related U.S. Application Data

(60) Provisional application No. 61/589,139, filed on Jan. 20, 2012.

(51) Int. Cl.
*C08L 33/08* (2006.01)
*C09D 133/08* (2006.01)

(52) U.S. Cl.
CPC .............. *C08L 33/08* (2013.01); *C09D 133/08* (2013.01)
USPC ................. 524/5; 524/44; 524/376; 524/378

(58) Field of Classification Search
CPC ............ C04B 24/00; C09L 33/08; C08K 3/00
USPC ........................................ 524/5, 44, 376, 378
See application file for complete search history.

(56) References Cited

U.S. PATENT DOCUMENTS

| | | |
|---|---|---|
| 3,365,315 A | 1/1968 | Beck |
| 3,709,706 A | 1/1973 | Sowman |
| 4,166,147 A | 8/1979 | Lange |
| 4,391,646 A | 7/1983 | Howell |
| 4,629,751 A | 12/1986 | Montgomery |
| 4,824,879 A | 4/1989 | Montgomery |
| 6,027,799 | 2/2000 | Castle |
| 6,358,309 B1 | 3/2002 | Langford |
| 6,531,528 B1 | 3/2003 | Kurp |
| 7,790,796 B2 | 9/2010 | Foster |
| 2009/0298968 A1 | 12/2009 | Bury |
| 2011/0086945 A1 | 4/2011 | Gozum |

FOREIGN PATENT DOCUMENTS

| | | |
|---|---|---|
| GB | 1399915 | 7/1975 |
| WO | WO 98-45380 | 10/1998 |
| WO | WO 00-66508 | 11/2000 |
| WO | WO 2009-121077 | 10/2009 |
| WO | WO 2009151988 A2 * | 12/2009 |

\* cited by examiner

*Primary Examiner* — Kelechi Egwim
(74) *Attorney, Agent, or Firm* — David B. Patchett

(57) ABSTRACT

A self-priming spackling compound includes between about 35% by weight and about 65% by weight acrylic latex resin, between about 20% by weight and about 50% by weight filler material, and between about 1% by weight and about 20% by weight water. In certain aspects, the latex resin may have an average latex particle size of less than about 0.18 microns, a minimum film formation temperature of less than about 15 degrees Celsius, and/or a glass transition temperature (Tg) of less than about 25 degrees Celsius. To further enhance the self-priming performance of the spackling compound, the formulation may further comprise a colorant such as titanium dioxide.

22 Claims, No Drawings

SELF PRIMING SPACKLING COMPOUND

BACKGROUND

The present invention relates generally to materials such as pastes or putties, often referred to as wall repair or spackling compounds, that are used to fill and repair holes, cracks and other minor surface defects or imperfections in wood, drywall and/or plaster.

Interior walls of homes and buildings are often constructed using gypsum wallboard panels (sometimes referred to as drywall). When cavities, recesses, holes, etc., are present (due to imperfections or damage) it is common to use spackling compound (also referred to as wall repair compound) to fill such cavities. Conventional spackling compounds often include one or more inorganic fillers, one or more polymeric resin binders, and various thickeners and other additives. Lightweight spackling compounds have been developed which often contain, among other inorganic fillers, relatively low density fillers such as glass bubbles, hollow silica, or expanded perlite. After spackling compound is applied to a wall, the water evaporates over a period of time resulting in the formation of a dried, hardened material which can be sanded, painted, etc.

Spackling compounds are known in the prior art. U.S. Pat. No. 6,531,528 (Kurp), for example, discloses a ready to use patch repair product that includes a color change indicator. After the product has dried the color changes to signal that, if desired, the worker can perform other operations such as painting, sanding, etc on the surface. U.S. Pat. No. 7,790,796 (Foster, et. al.) discloses a spackling compound that is easy to apply smoothly, can be applied in thicker layers than known spackling without cracking upon drying, and can be modified after drying without pitting, flaking, or crumbling, particularly at the edges of the applied spackling patch.

SUMMARY

Because spackling compound is typically more porous than the surrounding surface to which it is applied, in order to achieve a uniform surface that matches the original surface, spackling compound must be primed and sealed before it is painted. If left unprimed, spackling compound will produce dull spots that show through the paint, thereby resulting in an irregular surface where spackling compound has been used. In addition, if the wrong type of primer is used to prime the spackling compound, the primed spackling compound may appear shiny when it is painted.

The need exists for a spackling compound that, when painted, results in a consistent and uniform appearance that closely matches a surrounding surface without the need for priming. The present invention provides a spackling compound that, when painted, results in a consistent and uniform appearance that closely matches a surrounding surface without the need for priming.

In one embodiment, the spackling compound comprises between about 35% by weight and about 65% by weight acrylic latex resin, between about 20% by weight and about 50% by weight filler material, and between about 1% by weight and about 20% by weight water. In one aspect, the latex resin may have an average latex particle size of less than about 0.15, 0.16, 0.17 or 0.18 microns.

In another aspect, the spackling compound may include a resin having a minimum film formation temperature of less than about 15 degrees Celsius. In another aspect, the spackling compound may include a resin having a glass transition temperature (Tg) of less than about 25 degrees Celsius.

In another embodiment, the spackling compound may include at least one colorant. In another embodiment the spackling compound contains sufficient colorant so that the dried spackling compound passes the 6 mil hide test set forth in the specification. In a more specific embodiment, the spackling compound may comprise between about 2%, at least about 4%, at least about 6% or at least about 8% by weight colorant, and no greater than about 20%, 18%, 16% or 14% by weight colorant. In specific embodiments, the colorant may comprise titanium dioxide, carbon black, or mixtures thereof. In an even more specific embodiment, the spackling compound may include less than about 0.02 percent by weight carbon black.

In another aspect, the spackling compound may comprise a coalescing aid. In a specific embodiment, the coalescing aid may comprise trimethylpentanediol monoisobutyrate. In another embodiment, the coalescing aid may comprise less than about 1% by weight propylene glycol.

In another embodiment, the spackling compound may comprise a dispersing agent. In a specific embodiment, the dispersing agent may comprise less than about 1 percent by weight of a sodium salt of polymeric carboxylic acid.

In another embodiment, the spackling compound may include a lubricant. In a more specific embodiment, the lubricant may comprise less than about 1% by weight hydroxy ethyl cellulose.

In another embodiment, the spackling compound may include a filler comprising a bimodal distribution of particles. The bimodal distribution of particles may comprise at least one of glass bubbles and ceramic microspheres. In another embodiment, the filler may be substantially free of mined organic filler materials.

The spackling compound may optionally include a preservative/fungicide, or a bactericide. In more specific embodiment the bactericide may comprise 4,4-dimethyloxazolidine.

In certain embodiments, the dried spackling compound may have an average 85 degree gloss retention index of at least about 0.3, at least about 0.4, at least about 0.5, or at least about 0.6 when tested according to the test set forth in the specification.

In a specific embodiment, the present invention provides a spackling compound including between about 45% by weight and about 60% by weight acrylic latex resin, between about 25% by weight and about 45% by weight filler material, between about 5% by weight and about 15% by weight titanium dioxide, and between about 1% by weight and about 15% by weight water, wherein the latex resin has an average latex particle size of less than about 0.18 microns, a minimum film formation temperature of less than about 15 degrees Celsius, and a glass transition temperature (Tg) of less than about 25 degrees Celsius. In an even more specific embodiment, the dried spackling compound may have an average 85 degree gloss retention index of at least about 0.6 when tested according to the test set forth in the specification.

An advantage of certain embodiments of the spackling compound according to the present disclosure is that, when painted, it blends in generally uniformly and closely matches the appearance of a painted surrounding surface to which it is applied. That is, the spackling compound behaves as though it has been primed even though it has not been primed. In addition, the spackling compound has properties such as hardness, workability, gloss retention, paint anchorage, and adhesion that are similar to those of conventional spackling compounds.

DETAILED DESCRIPTION

A spackling compound according to the present disclosure generally includes a resin, filler material and water. Other optional ingredients may be included in various other embodiments. In one embodiment, the resin is an acrylic resin and, more specifically, a latex acrylic resin. In a more specific embodiment, the spackling compound includes between about 35% by weight and about 65% by weight latex acrylic resin, between about 20% by weight and about 50% by weight filler material, and between about 1% by weight and about 20% by weight water. All percentages by weight disclosed herein are based on the total as-formulated weight of the spackling compound (i.e., including water), unless otherwise noted. The resin, filler, and optional ingredients are each described in greater detail below.

The self-priming spackling compound disclosed herein comprises at least one resin binder. Suitable binders are often supplied as an aqueous latex emulsion (comprising, for example, between 40-60 percent solids of polymeric resin binder, in water). Resins potentially suitable for binders in the present spackling compound include, for example, acrylic latex emulsion resins. In various embodiments, the latex emulsion resins can comprise at least about 20 percent, 30 percent, or 40 percent, by weight, of the spackling compound.

In accordance with one aspect of the spackling compound, it has been found that some resins, when used in spackling compound formulations, produce spackling compounds that—upon painting of the wall containing the dried spackling compound—produce a better match with a painted surface surrounding the patched region without the need to be primed. That is, some resins result in spackling compounds that act more as if they have been primed when dry than others resins, thereby producing a spackling that blends in more naturally and inconspicuously with the surrounding un-repaired substrate when painted.

More specifically, it has been found spackling compounds containing acrylic latex resins having latex particles below a certain size result in dried spackling compound that do not need to be primed. That is, the dried spackling compound behaves more like it has been primed, whereby it blends in more seamlessly with the surrounding surface that does not include the spackling compound. While not wishing to be bound by theory, it is believed that smaller latex particles allow the resin to form a tighter film when the spackling compound dries, and the tighter film results in a spackling compound that behaves more like it has been primed. In specific embodiments, the resin may have an average latex particle size of less than about 0.18 microns, less than about 0.16 microns, less than about 0.14 microns, or less than about 0.12 microns.

It has also been found that resins having a glass transition temperature ($T_g$) below a certain temperature produce spackling compounds having more desirable primer-like properties when dried. That is, when resins having a Tg below a certain temperature are used in the spackling compound, the dried spackling compound will perform as though it has been primed. As a result, the dried spackling compound when painted will closely match the appearance of a surrounding painted surface. In some embodiments, desirable resins will have a glass transition temperature of less than about 25° C., less than about 20° C., or less than about 15° C. The term "glass transition temperature" is a term well known in the art and generally relates to a softening temperature indicative of the onset of long range translational motion of polymer molecules.

It has also been found that spackling compounds including resin binders having a minimum film formation temperature below a certain temperature have more desirable primer-like properties. In some embodiments, desirable resins will have a minimum film formation temperature as determined according to ASTM Method D 2354-10 of less than about 18° C., less than about 15° C., or less than about 12° C.

Specific resins suitable for use in the spackling compound include the acrylic latex emulsion binder available (as a 43.5 percent solids latex emulsion) from Arkema Coating Resins of Cary, N.C., under the trade designation ENCOR 627, or the acrylic latex emulsion binder available (as a 50 percent solids latex emulsion) from Arkema Coating Resins of Cary, N.C., under the trade designation ENCOR 631. The ENCOR 627 acrylic latex binder has a particle size of 0.10 microns, a minimum filming temperature of 9° C., and a glass transition temperature of 15° C. The ENCOR 631 acrylic latex binder has a particle size ranging from 0.10-0.15 microns, a minimum filming temperature of 0° C., and a glass transition temperature (onset) of less than 4° C.

The spackling compound includes filler. The filler may be, for example, a filler system that comprises one or more inorganic fillers. In various embodiments, the inorganic filler system comprises at least about 15%, 20%, or 25%, by weight, of the spackling compound (as previously noted, this and all other percentages by weight disclosed herein are based on the total as-formulated weight of the spackling compound (i.e., including water), unless otherwise noted). In further embodiments, the inorganic filler system comprises at most about 45%, 55%, or 65% by weight, of the weight of the spackling compound as formulated.

Suitable filler materials include natural inorganic materials such as calcite, witherite, rutile, anatase, ilmenite, mica, sericite, perlite, talc, limestone, silica, barite, gypsum, calcined gypsum, kaolinite, montmorillonite, attapulgite, illite, saponite, hectorite, beidellite, stevensite, sepiolite, bentonite, pyrophyllite, diatomaceous earth, and the like, and such as synthetic inorganic fillers such as so-called glass bubbles (such as those available from 3M Company of St. Paul, Minn., under the trade designation 3M Glass Bubbles), ceramic microspheres (such as those available from 3M Company under the trade designation 3M Ceramic Microspheres), synthetic clays (e.g., synthetic silicate clays such as those available under the trade designation Laponite from Southern Clay Products, Gonzales, Tex.), precipitated silica, fumed silica, vitreous silica, synthetic titanium dioxide (as made, for example, by the sulfate process or the chloride process), synthetic (precipitated) calcium carbonate (as made, for example, by passing carbon dioxide through a solution of calcium hydroxide), and the like In certain embodiments, the filler material comprises a bimodal particle size mixture of larger filler particles and smaller filler particles. In various specific embodiments, the filler material comprises a bimodal particle size mixture of filler particles comprising a particle size ratio of larger particle size filler to smaller particle size filler (as obtained by ratioing the median particle size of the two filler populations) of at least about 5:1, 10:1 or 15:1. In various specific embodiments, the particle size ratio is at most about 40:1, 30:1, or 20:1.

In various embodiments, the larger particle size filler particles comprise a median particle size of at least about 15, 30 or 40 microns, and of at most about 80, 65 or 55 microns. In various embodiments, the smaller particle size synthetic inorganic filler particles comprise a median particle size of at least about 1, 2, or 3 microns, and of at most about 15, 10 or 5 microns.

In a specific embodiment, the synthetic inorganic fillers are comprised of substantially spherical particles. In this context, substantially spherical denotes that a substantial majority of the particles are spherical except for such occasional deviations, deformities, etc. as are known to those of skill in the art to be occasionally encountered in the manufacturing processes used to produce the particles (for example, somewhat misshapen particles may be occasionally produced, two or more particles may agglomerate or adhere to each other, and so on).

Suitable substantially spherical synthetic inorganic fillers as defined herein include so-called glass bubbles (such as those available from 3M Company of St. Paul, Minn., under the trade designation 3M Glass Bubbles), and ceramic microspheres (such as those available from 3M Company under the trade designation 3M Ceramic Microspheres). Such glass bubbles can be synthesized, for example, by a process as described in U.S. Pat. Nos. 3,365,315 and 4,391,646. Such ceramic microspheres can be synthesized, for example, by sol-gel processes, as described for example in U.S. Pat. Nos. 3,709,706 and 4,166,147. Other methods potentially useful for making ceramic particles and/or microspheres are described in, for example, U.S. Pat. No. 6,027,799.

In particular embodiments, the larger particle size synthetic inorganic filler comprises glass bubbles and the smaller particle size synthetic inorganic filler comprises ceramic microspheres. In various embodiments, the glass bubbles comprise a median particle size of at least about 15, 30 or 40 microns, and of at most about 80, 65 or 55 microns. In various embodiments, the ceramic microspheres comprise a median particle size of at least about 1, 2, or 3 microns, and of at most about 15, 10 or 5 microns.

It has been found that the use of such substantially spherical fillers as described above, and in particular the use of a bimodal mixture of such fillers, can help provide a spackling compound that spreads easily and yet does not sag, run or slump to an excessive degree when applied to a vertical surface.

To enhance the ability of the spackling compound to "hide", the spackling compound may also include one or more colorants. One suitable colorant is, for example, titanium dioxide. While not wishing to be bound by theory, it is believed that titanium dioxide reflects light and thereby effectively hides differences in the substrate color/appearance when added to the spackling compound formulation. In a specific embodiment, the amount of titanium dioxide may range from at least about 3%, 5%, or 7% by weight, to no greater than 20%, 17%, or 15% by weight. Another suitable colorant is carbon black. Specific colorants suitable for use in the spackling compound include TI-PURE R700 titanium dioxide available from DuPont Chemicals, Wilmington, Del., and MONARCH 120 carbon black available from Cabot Corporation, Boston, Mass.

To enhance the film forming properties of the resin, the spackling compound may include a coalescing aid, which may also be referred to as a coalescing aid. While not wishing to be bound by theory, it is believed that the coalescing aid serves to soften the latex particles so the individual particles combine to form a continuous film. In a specific embodiment, the coalescing aid comprises less than about 1% by weight of the spackling compound formulation. Suitable coalescing aids include COASOL coalescing aid available from Dow Haltermann Custom Processing, Middlesbrough, UK, and TEXANOL ester alcohol available from Eastman Chemical Kingsport, Tenn.

In other embodiments, the coalescing aid may include hydrocarbon molecules comprising exactly one hydroxyl group and further comprising an ether linkage. In one embodiment, the coalescing aid comprises one or more of the compounds generally known in the art as glycol ethers and comprising a linear hydrocarbon chain with exactly one or exactly two ether groups in the chain, and bearing a single hydroxyl group. The hydroxyl group may for example be attached to a terminal carbon of the chain, or attached to a carbon adjacent to a terminal carbon of the chain, or attached to some other carbon of the molecule. The linear chain may also comprise one or more methyl groups or other alkyl groups attached to the carbons of the chain.

Such glycol ether coalescing aids typically comprise a relatively low molecular weight (e.g., from about 90 g/mole to about 250 g/mole); are typically liquid at room temperature (e.g., 22° C.); and, while typically being partially or completely miscible with water, do not act to substantially increase the viscosity of water when added to water.

As such, these glycol ether coalescing aids are distinguished from organic polymeric thickeners such as the above-described relatively high molecular weight polyhydroxy materials that comprise multiple hydroxyl groups. As such, they are also distinguished from organic polymeric thickeners such as poly(ethylene oxide) and/or polyethylene glycol and derivatives thereof, which, although possibly not possessing hydroxyls, possess multiple (e.g., greater than three) ether linkages which render the molecules relatively hydrophilic and serve to make them function in a well known capacity as aqueous viscosity-increasing agents.

Thus in summary, the glycol ether coalescing aids disclosed herein may be distinguished from conventional thickeners based on their chemical formula and/or their chemical structure; and/or, when used in a wall repair compound, by the apparent viscosity-lowering effect of the coalescing aids, and/or by the absence of the relatively high shrink upon drying which is often associated with conventional thickeners.

The glycol ether coalescing aids disclosed herein may also be distinguished from relatively small, low molecular weight (e.g., less than about 500 g/mole) molecules that have multiple hydroxyls. Such low molecular weight polyhydroxy molecules have been found by the inventors not to have the advantageous effects of the glycol ether coalescing aids. For example, a wall repair formulation comprising glycerol (MW of 92 g/mole, with three hydroxyls) was found by the inventors to exhibit a much tackier consistency which lacked certain advantageous properties of the compositions described above. Such low molecular weight polyhydroxy molecules are sometimes found in wall repair compounds (for example, as mentioned in U.S. Pat. No. 4,629,751 as being useable to inhibit gelation of certain wall repair compositions). Thus, in certain embodiments, the wall repair compounds disclosed herein comprise less than 0.1, 0.05, or 0.02 percent, by weight, of low molecular weight polyhydroxy molecules.

In other embodiments the spackling compound further comprises a dispersing agent. The dispersing agent may comprise, for example, a sodium salt of polymeric carboxylic acid. In a specific embodiment, the dispersing agent comprises less than about 1% by weight of the spackling compound formulation. A suitable dispersing agent is available from Rohm and Haas Company, Philadelphia, Pa. under the tradename TAMOL 850.

The spackling compound may also include a thickener (also referred to as lubricants, gelling agents, bodying agents, water retention agents, etc.). Suitable thickeners include, for example, polysaccharides and derivatives thereof, for example, the well known cellulose ethers (e.g., methyl cellulose, hydroxypropyl cellulose, hydroxypropyl methyl cellulose, hydroxyethyl cellulose, hydroxyethyl methyl cellulose, hydroxyethyl hydroxypropyl cellulose, ethylhydroxyethyl cellulose, and sodium carboxymethyl cellulose). Such thickeners can also include for example polyethylene glycol, polyethylene oxide (and/or polyethylene oxide/polypropylene oxide copolymers), polyvinyl alcohol, polymers or copolymers of ethylenically unsaturated carboxylic acids and their derivatives, such as acrylic acid and acrylamide, guar gum, xanthan gum, alginates, tragacanth gum, pectin, amylopectin, dextran, polydextrose, and the like. In a specific embodiment, the lubricant comprises less than about 1% by weight of the spackling compound formulation. In certain embodiments, a desirable lubricant is hydroxyethyl cellulose.

Certain natural or synthetic inorganic fillers (for example, clays such as attapulgite, bentonite, montmorillonite, illite, kaolinite, sepiolite, the synthetic clay available under the trade designation Laponite from Southern Clay Products, etc.), are known to exhibit a thickening (e.g., viscosity-increasing) effect when dispersed in water. Such materials (particularly those that absorb water and/or swell upon exposure to water) have commonly been used as thickeners in spackling compounds (they are also occasionally referred to in the art as rheology modifiers, non-leveling agents, etc.), and are known in the art to contribute to shrinkage upon drying (as discussed, for example, in U.S. Pat. No. 4,824,879). Thus, in certain embodiments, the spackling compounds disclosed herein comprise less than 0.1, 0.05, or 0.02 percent, by weight, of (natural or synthetic) inorganic thickening filler clay. In a particular embodiment, the spackling compounds may include less than about 0.1 percent by weight of inorganic thickening filler clay, and further comprise less than about 0.1 percent by weight of organic polymeric thickener.

In addition to the components described above, other components may be added to the spackling compound. These additional ingredients may include, for example, water, which may be added at the end of the production process, for final adjustment of e.g., viscosity. Thus, in certain embodiments, water (in addition to the water present in the aqueous latex binder emulsion) may be added to the formulation. Other additives that may be present include preservatives which may have advantageous effects on the spackling compound during storage, and may also serve to minimize the degree to which mold or fungus may grow on the dried spackling compound. Thus in certain embodiments, the spackling compound may include at least about 0.1 percent, 0.2 percent, or 0.3 percent by weight of a preservative or preservatives. In further embodiments, the spackling compound may include no greater than at most about 1.0 percent, 0.8 percent, or 0.6 percent by weight of a preservative or preservatives. Suitable preservatives include, for example, those available under the designation Mergal 192 and Polyphase P20T, from Troy Corporation of Florham Park, N.J.

The spackling compound may also include dust reducing additives which in some circumstances may serve to further reduce the quantity of airborne dust particles generated when sanding the dried, hardened spackling compound. Exemplary dust reducing additives include, for example, oils (such as mineral oils, vegetable oils, and animal oils), waxes (including natural and synthetic waxes), and the like. Suitable dust reducing additives may be chosen, for example, from those discussed in U.S. Pat. No. 6,358,309, the entire contends of which are herein incorporated by reference for this purpose.

Other components may also be added to the spackling compound formulation for various purposes, including but not limited to, antifreeze additives, surfactants, defoamers, plasticizers (e.g., for the polymeric binder used), reinforcing fibers, and so on. Such additives may be included as long as they do not significantly detract from other desirable properties of the spackling compound or unduly interfere with the use of the formulation as a spackling compound.

Examples

In order that the invention described herein can be more fully understood, the following examples are set forth. It should be understood that these examples are for illustrative purposes only, and are not to be construed as limiting this invention in any manner.

Test Methods

Hardness

An approximately 6 inch long by 1.5 inch wide by 0.25 inch deep mass of spackle was cast using a form of the same dimensions onto primed (PROMAR White Interior Latex Primer B28 W 8200, available from Sherwin-Williams Company, Cleveland, Ohio) drywall board (GOLD BOND Gypsum Board, available from National Gypsum, Charlotte, N.C.). To ensure that the spackle surface was level, a flexible putty knife was run over the top of the form. The form was removed and the spackle was allowed dry at ambient conditions for 24 hours.

After 24 hours, the surface of the spackle was lightly sanded using a fine grade sanding sponge to ensure that it was level (3M Pro Grade Fine Sanding Sponge, available from 3M Company, Maplewood, Minn.). The spackle surface was then wiped with a damp cloth to remove any dust and debris.

A Shore Durometer (Type OO available from Instron Company, Norwood, Mass.) was used to obtain the Shore hardness values. The durometer was placed across the width of the spackle sample and an initial reading was quickly recorded. After 60 seconds a second reading was recorded. The data reported in the Tables is an average of three readings taken on the same sample.

Paint Gloss Retention Index

An approximately 6 inch long by 1.5 inch wide by 0.25 inch deep mass of spackle was cast using a form of the same dimensions onto primed (PROMAR White Interior Latex Primer B28 W 8200, available from Sherwin-Williams Company, Cleveland, Ohio) drywall board (GOLD BOND Gypsum Board, available from National Gypsum, Charlotte, N.C.). To ensure that the spackle surface was level, a flexible putty knife was run over the top of the form. The form was removed and the spackle was allowed dry at ambient conditions for 24 hours.

After 24 hours, the surface of the spackle was lightly sanded using a fine grade sanding sponge to ensure that it was level (3M Pro Grade Fine Sanding Sponge, available from 3M Company, Maplewood, Minn.). The spackle surface was then wiped with a damp cloth to remove any dust and debris.

A thin, complete coating of paint was applied to the spackle surface using a paint brush (Wooster 4212 LINDBECK Neat Double Angle Sash Paint Brush, available from The Wooster Brush Company, Wooster, Ohio) and a waterborne interior paint (AURA waterborne interior paint, eggshell finish, blazing orange, available from Hirshfield's, Woodbury, Minn.). The paint brush was passed back and forth across the spackle surface at least two times. The paint coating was allowed to dry at ambient conditions for 24 hours. A small section of the primed drywall board was also be painted in order to obtain gloss readings on primed drywall board wallboard (as a control) for a Paint Gloss Retention Index calculation.

After drying for 24 hours, the gloss was measured using a handheld gloss meter (micro-TRI-gloss, Cat. No. 4520, available from BYK Gardner Inc. Silver Spring, Md.) and the results recorded. The Gloss Retention Index was calculated by comparing the gloss reading of a painted spackle sample at 85 degree (Deg) and dividing it by the gloss reading of the painted, primed drywall board at 85 Deg. The data reported in the Tables are an average of three readings taken on the same sample.

Gloss Retention Index=85 Deg Gloss Reading of painted spackle sample/85 Deg Gloss Reading of painted, primed drywall board Paint Anchorage An approximately 6 inch long by 1.5 inch wide by 0.25 inch deep mass of spackle was cast using a form of the same dimensions onto primed (PROMAR White Interior Latex Primer B28 W 8200, available from Sherwin-Williams Company, Cleveland, Ohio) drywall board (GOLD BOND Gypsum Board, available from National Gypsum, Charlotte, N.C.). To ensure that the spackle surface was level a flexible putty knife was run over the top of the form. The form was removed and the spackle was allowed dry at ambient conditions for 24 hours.

After 24 hours, the surface of the spackle was lightly sanded using a fine grade sanding sponge to ensure that it was level (3M Pro Grade Fine Sanding Sponge, available from 3M Company, Maplewood, Minn.). The spackle surface was then wiped with a damp cloth to remove any dust and debris.

A thin, complete coating of paint was applied to the spackle surface using a paint brush (Wooster 4212 LINDBECK Neat Double Angle Sash Paint Brush, available from The Wooster Brush Company, Wooster, Ohio) and a waterborne interior paint (AURA waterborne interior paint, eggshell finish, blazing orange, available from Hirshfield's, Woodbury, Minn.). The paint brush was passed back and forth across the spackle surface at least two times. The paint coating was allowed to dry (at ambient conditions?) for 24 hours. After drying for 24 hours, a 1 inch wide strip of suitable masking tape (SCOTCH BLUE #2093 Advanced Multi-Surface Painter's Tape with EDGE-LOCK, available from 3M Company, Maplewood, Minn.) was applied to the spackle surface and was and pressed down firmly with thumb pressure. The tape was allowed to dwell on the spackle surface for 24 hours. Then the tape was pulled off of the spackle surface in a direction parallel to the surface (180° peel) at an approximate rate of 12 inches per minute. If any paint was removed with the tape, the sample was classified as "Fail". If no paint was removed by the tape, the sample was classified as "Pass".

Hiding Power Comparison

An approximately 6 inch long by 1.5 inch wide by 6 mil deep mass of spackle was cast using a form of the same dimensions onto a Leneta Spreading Rate Chart (Form 13H Spreading Rate Chart, patterned with black and white stripes, available from Leneta Company, Mahwah, N.J.). A flexible putty knife was run over the top of the form to ensure that the spackle surface was level. The form was removed and the spackle was allowed to dry at ambient conditions for 24 hours.

After the spackle had dried for 24 hours, the mass of spackle was inspected to determine if there was any show through (i.e., could black color been seen through the spackle layer). If show through was observed, this was recorded as "Fail". If there was no show through, this was recorded as "Pass".

EXAMPLES

Example 1

A batch of wall repair compound was synthesized by the following general methods. The following equipment was provided: a high shear mixer equipped with a Cowles Blade, and a low shear (Hobart) mixer. ENCOR Latex 627 (100% acrylic latex) was obtained from Arkema Coating Resins. The ENCOR 627 acrylic latex binder has a particle size of 0.10 microns, a minimum film forming temperature of 9° C., and a glass transition temperature of 15° C. K-20 Glass bubbles were obtained from 3M Company. W210 Ceramic Microspheres were obtained from 3M Company. Titanium dioxide (TI-PURE R700) was obtained from DuPont Chemicals, Wilmington, Del. POLYPHASE P20T and MERGAL 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation DOWANOL PnB). DYNOL 604 antifoam is available from Air Products. MONARCH 120 carbon black is available from the Cabot Corporation. The particle size of MONARCH 120 is about 60 nm and the size of the dispersed aggregate is 150-200 nm. MONARCH 120 has a tint strength of 55 tint units, as measured by ASTM D3265-11.

The ENCOR 627 aqueous binder emulsion was added to a suitable sized beaker that was being stirred with an overhead driven Cowles mixing blade set on low speed. The DYNOL 604, POLYPHASE P20T, MERGAL 192, propylene glycol butyl ether, and MONARCH 120 were then added sequentially, while stirring on low speed. Following this, the W210 ceramic microspheres were slowly added with the mixer initially set on low speed. As the viscosity of the mixture built upon addition of the ceramic microspheres, the mixer speed was increased. After addition was complete, mixing of this pre-mix was continued for approximately 5 minutes. The premix was then used without delay in the following step: The glass bubble filler was added to the mixing bowl of the low shear mixer. The premix was then added to the mixer by aid of a rubber spatula and the mixer was covered with a plastic or aluminum film to contain the very low density glass bubbles that tend to be stirred out of the bowl without a physical means to contain them. After providing this containment, the mixer was started on low speed very briefly multiple times until virtually all the glass bubbles were wet with the premix mixture. At that point the plastic or aluminum film could be removed from the bowl. At this point the mixer speed was increased to medium for approximately two minutes, then to high for approximately one minute. The mixer was then stopped and the batch was inspected. Water was added as needed to provide the desired consistency of the product. A skilled operator can determine the amount of water to add while mixing at high speed by auscultation; if the viscosity is the correct range, the mixture will make a distinctive low pitched sound as air begins to be entrained in the mixture. The mixture was then transferred to a plastic bucket with a lid, for storage.

All components listed in Table 1 for Example 1 are in weight percent, of the wall repair compound as formulated. (ENCOR 627 is an aqueous emulsion comprising 50 percent total solids). The batch size was approximately 2.0 kilograms (kg). It should be understood that the percentages reported for this and the other Examples herein reflect the accuracy and tolerances of the apparatus and measurements used.

TABLE 1

| Component | Weight Percent |
| --- | --- |
| ENCOR 627 Binder Emulsion | 47.05 |
| K-20 Glass Bubbles | 21.30 |

TABLE 1-continued

| Component | Weight Percent |
| --- | --- |
| Ceramic Microspheres | 13.09 |
| Titanium Dioxide | 11.61 |
| Propylene Glycol Butyl Ether | 0.20 |
| POLYPHASE P20T | 0.35 |
| MERGAL 192 | 0.09 |
| Antifoam | 0.002 |
| Carbon Black | 0.006 |
| Water to adjust | 6.29 |

Example 2

A batch of wall repair compound was synthesized by the following general methods. The following equipment was provided: a high shear mixer equipped with a Cowles Blade, and a low shear (Hobart) mixer. ENCOR Latex 631 (binder emulsion) was obtained from Arkema Coating Resins. The ENCOR 631 acrylic latex binder has a particle size ranging from 0.10-0.15 microns, a minimum film forming temperature of 0° C., and a glass transition temperature (onset) of less than 4° C. The latex binder was provided in an amount small than the amount provided in Example 1.

K-20 Glass bubbles were obtained from 3M Company. W210 Ceramic Microspheres were obtained from 3M Company. POLYPHASE P20T and MERGAL 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation DOWANOL PnB).

The ENCOR 631 aqueous binder emulsion was added to a suitable sized beaker that was being stirred with an overhead driven Cowles mixing blade set on low speed. The POLYPHASE P20T, MERGAL 192, and propylene glycol butyl ether were then added sequentially, while stirring on low speed. Following this, the W210 ceramic microspheres were slowly added with the mixer initially set on low speed. As the viscosity of the mixture built upon addition of the ceramic microspheres, the mixer speed was increased. After addition was complete, mixing of this pre-mix was continued for approximately 5 minutes. The premix was then used without delay in the following step: The glass bubble filler was added to the mixing bowl of the low shear mixer. The premix was then added to the mixer by aid of a rubber spatula and the mixer was covered with a plastic or aluminum film to contain the very low density glass bubbles that tend to be stirred out of the bowl without a physical means to contain them. After providing this containment, the mixer was started on low speed very briefly multiple times until virtually all the glass bubbles were wet with the premix mixture. At that point the plastic or aluminum film could be removed from the bowl. At this point the mixer speed was increased to medium for approximately two minutes, then to high for approximately one minute. The mixer was then stopped and the batch was inspected. Water was added as needed to provide the desired consistency of the product. A skilled operator can determine the amount of water to add while mixing at high speed by auscultation; if the viscosity is the correct range, the mixture will make a distinctive low pitched sound as air begins to be entrained in the mixture. The mixture was then transferred to a plastic bucket with a lid, for storage.

All components listed in Table 2 for Example 2 are in weight percent, of the wall repair compound as formulated.

(ENCOR 631 is an aqueous emulsion comprising 50 percent total solids). The batch size was approximately 400 grams (g).

TABLE 2

| Component | Weight Percent |
| --- | --- |
| ENCOR 631 Binder Emulsion | 38.19 |
| K-20 Glass Bubbles | 27.10 |
| Ceramic Microspheres | 16.65 |
| Propylene Glycol Butyl Ether | 0.25 |
| POLYPHASE P20T | 0.44 |
| MERGAL 192 | 0.11 |
| Water to adjust | 17.25 |

Example 3

A batch of wall repair compound was synthesized by the following general methods. The following equipment was provided: a high shear mixer equipped with a Cowles Blade, and a low shear (Hobart) mixer. ENCOR Latex 631 (binder emulsion) was obtained from Arkema Coating Resins. The ENCOR 631 acrylic latex binder has a particle size ranging from 0.10-0.15 microns, a minimum film forming temperature of 0° C., and a glass transition temperature (onset) of less than 4° C. The latex binder was provided in a quantity greater than the amount provided in Example 1.

K-20 Glass bubbles were obtained from 3M Company. W210 Ceramic Microspheres were obtained from 3M Company. POLYPHASE P20T and MERGAL 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation DOWANOL PnB).

The ENCOR 631 aqueous binder emulsion was added to a suitable sized beaker that was being stirred with an overhead driven Cowles mixing blade set on low speed. The POLYPHASE P20T, MERGAL 192, and propylene glycol butyl ether were then added sequentially, while stirring on low speed. Following this, the W210 ceramic microspheres were slowly added with the mixer initially set on low speed. As the viscosity of the mixture built upon addition of the ceramic microspheres, the mixer speed was increased. After addition was complete, mixing of this pre-mix was continued for approximately 5 minutes. The premix was then used without delay in the following step: The glass bubble filler was added to the mixing bowl of the low shear mixer. The premix was then added to the mixer by aid of a rubber spatula and the mixer was covered with a plastic or aluminum film to contain the very low density glass bubbles that tend to be stirred out of the bowl without a physical means to contain them. After providing this containment, the mixer was started on low speed very briefly multiple times until virtually all the glass bubbles were wet with the premix mixture. At that point the plastic or aluminum film could be removed from the bowl. At this point the mixer speed was increased to medium for approximately two minutes, then to high for approximately one minute. The mixer was then stopped and the batch was inspected. Water was added as needed to provide the desired consistency of the product. A skilled operator can determine the amount of water to add while mixing at high speed by auscultation; if the viscosity is the correct range, the mixture will make a distinctive low pitched sound as air begins to be entrained in the mixture. The mixture was then transferred to a plastic bucket with a lid, for storage.

All components listed in Table 3 for Example 3 are in weight percent, of the wall repair compound as formulated. (ENCOR 631 is an aqueous emulsion comprising 50 percent total solids). The batch size was approximately 450 g.

TABLE 3

| Component | Weight Percent |
|---|---|
| ENCOR 631 Binder Emulsion | 54.87 |
| K-20 Glass Bubbles | 24.84 |
| Ceramic Microspheres | 15.26 |
| Propylene Glycol Butyl Ether | 0.23 |
| POLYPHASE P20T | 0.41 |
| MERGAL 192 | 0.10 |
| Water to adjust | 4.29 |

Example 4

A batch of wall repair compound was synthesized using a different binder emulsion than in Examples 1-3 by the following general methods. The following equipment was provided: a high shear mixer equipped with a Cowles Blade, and a low shear (Hobart) mixer. ENCOR Latex 631 (binder emulsion) was obtained from Arkema Coating Resins. The ENCOR 631 acrylic latex binder has a particle size ranging from 0.10-0.15 microns, a minimum film forming temperature of 0° C., and a glass transition temperature (onset) of less than 4° C. K-20 Glass bubbles were obtained from 3M Company. W210 Ceramic Microspheres were obtained from 3M Company. Titanium dioxide (TI-PURE R700) was obtained from DuPont Chemicals, Wilmington, Del. POLYPHASE P20T and MERGAL 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation DOWANOL PnB). DYNOL 604 antifoam is available from Air Products. MONARCH 120 carbon black is available from the Cabot Corporation. The particle size of MONARCH 120 is about 60 nm and the size of the dispersed aggregate is 150-200 nm. MONARCH 120 has a tint strength of 55 tint units, as measured by ASTM D3265-11.

The ENCOR 631 aqueous binder emulsion was added to a suitable sized beaker that was being stirred with an overhead driven Cowles mixing blade set on low speed. The DYNOL 604, POLYPHASE P20T, MERGAL 192, and propylene glycol butyl ether were then added sequentially, while stirring on low speed. Following this, the W210 ceramic microspheres, followed by titanium dioxide were slowly added with the mixer initially set on low speed. As the viscosity of the mixture built upon addition of the ceramic microspheres and titanium dioxide, the mixer speed was increased. After addition was complete, mixing of this pre-mix was continued for approximately 5 minutes. The premix was then used without delay in the following step: The glass bubble filler was added to the mixing bowl of the low shear mixer. The premix was then added to the mixer by aid of a rubber spatula and the mixer was covered with a plastic or aluminum film to contain the very low density glass bubbles that tend to be stirred out of the bowl without a physical means to contain them. After providing this containment, the mixer was started on low speed very briefly multiple times until virtually all the glass bubbles were wet with the premix mixture. At that point the plastic or aluminum film could be removed from the bowl. At this point the mixer speed was increased to medium for approximately two minutes, then to high for approximately one minute. The mixer was then stopped and the batch was inspected. Water was added as needed to provide the desired consistency of the product. A skilled operator can determine the amount of water to add while mixing at high speed by auscultation; if the viscosity is the correct range, the mixture will make a distinctive low pitched sound as air begins to be entrained in the mixture. The mixture was then transferred to a plastic bucket with a lid, for storage.

All components listed in Table 4 for Example 4 are in weight percent, of the wall repair compound as formulated. (ENCOR 631 is an aqueous emulsion comprising 50 percent total solids). The batch size was approximately 400 g.

TABLE 4

| Component | Weight Percent |
|---|---|
| ENCOR 631 Binder Emulsion | 47.38 |
| K-20 Glass Bubbles | 21.45 |
| Ceramic Microspheres | 13.18 |
| Titanium Dioxide | 11.70 |
| Propylene Glycol Butyl Ether | 0.20 |
| POLYPHASE P20T | 0.35 |
| MERGAL 192 | 0.09 |
| Antifoam | 0.002 |
| Carbon Black | 0.006 |
| Water to adjust | 5.65 |

Example 5

A batch of wall repair compound using 10% DOWANOL PnB was synthesized by the following general methods. The following equipment was provided: a high shear mixer equipped with a Cowles Blade, and a low shear (Hobart) mixer. ENCOR Latex 627 (binder emulsion) was obtained from Arkema Coating Resins. The ENCOR 627 acrylic latex binder has a particle size of 0.10 microns, a minimum film forming temperature of 9° C., and a glass transition temperature of 15° C. K-20 Glass bubbles were obtained from 3M Company. K-20 Glass bubbles were obtained from 3M Company. W210 Ceramic Microspheres were obtained from 3M Company. Titanium dioxide (TI-PURE R700) was obtained from DuPont Chemicals, Wilmington, Del. POLYPHASE P20T and MERGAL 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation DOWANOL PnB). TEXANOL Ester Alcohol (2,2,4-Trimethyl-1,3-pentanediol-mono(2-methylpropanoate)), CAS Number 25265-77-4, was obtained from the Eastman Chemical Company, Kingsport, Tenn. DYNOL 604 antifoam is available from Air Products. MONARCH 120 carbon black is available from the Cabot Corporation. The particle size of MONARCH 120 is about 60 nm and the size of the dispersed aggregate is 150-200 nm. MONARCH 120 has a tint strength of 55 tint units, as measured by ASTM D3265-11.

The ENCOR 627 aqueous binder emulsion was added to a suitable sized beaker that was being stirred with an overhead driven Cowles mixing blade set on low speed. The DYNOL 604, POLYPHASE P20T, MERGAL 192, propylene glycol butyl ether, TEXANOL and MONARCH 120 were then added sequentially, while stirring on low speed. Following this, the W210 ceramic microspheres were slowly added with the mixer initially set on low speed. As the viscosity of the mixture built upon addition of the ceramic microspheres, the mixer speed was increased. After addition was complete, mixing of this pre-mix was continued for approximately 5 minutes. The premix was then used without delay in the following step: The glass bubble filler was added to the mixing bowl of the low shear mixer. The premix was then added to the mixer by aid of a rubber spatula and the mixer was covered with a plastic or aluminum film to contain the very low density glass bubbles that tend to be stirred out of the bowl without a physical means to contain them. After providing this containment, the mixer was started on low speed very briefly multiple times until virtually all the glass bubbles were wet with the premix mixture. At that point the plastic or aluminum film could be removed from the bowl. At this point the mixer speed was increased to medium for approximately two minutes, then to high for approximately one minute. The mixer was then stopped and the batch was inspected. Water was added as needed to provide the desired consistency of the product. A skilled operator can determine the amount of water to add while mixing at high speed by auscultation; if the viscosity is the correct range, the mixture will make a distinctive low pitched sound as air begins to be entrained in the mixture. The mixture was then transferred to a plastic bucket with a lid, for storage.

All components listed in Table 5 for Example 5 are in weight percent, of the wall repair compound as formulated. (ENCOR 627 is an aqueous emulsion comprising 50 percent total solids). The batch size was approximately 250 g.

TABLE 5

| Component | Weight Percent |
| --- | --- |
| ENCOR 627 Binder Emulsion | 46.92 |
| K-20 Glass Bubbles | 21.24 |
| Ceramic Microspheres | 13.05 |
| Titanium Dioxide | 11.58 |
| Propylene Glycol Butyl Ether | 0.18 |
| TEXANOL | 0.02 |
| POLYPHASE P20T | 0.35 |
| MERGAL 192 | 0.09 |
| Antifoam | 0.002 |
| Carbon Black | 0.006 |
| Water to adjust | 6.56 |

Example 6

A batch of wall repair compound was synthesized using 20% DOWANOL PnB by the following general methods. The following equipment was provided: a high shear mixer equipped with a Cowles Blade, and a low shear (Hobart) mixer. ENCOR Latex 627 (binder emulsion) was obtained from Arkema Coating Resins. The ENCOR 627 acrylic latex binder has a particle size of 0.10 microns, a minimum film forming temperature of 9° C., and a glass transition temperature of 15° C. K-20 Glass bubbles were obtained from 3M Company. K-20 Glass bubbles were obtained from 3M Company. W210 Ceramic Microspheres were obtained from 3M Company. Titanium dioxide (TI-PURE R700) was obtained from DuPont Chemicals, Wilmington, Del. POLYPHASE P20T and MERGAL 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation DOWANOL PnB). TEXANOL Ester Alcohol (2,2,4-Trimethyl-1,3-pentanediol-mono(2-methylpropanoate)), CAS Number 25265-77-4, was obtained from the Eastman Chemical Company, Kingsport, Tenn. DYNOL 604 antifoam is available from Air Products. MONARCH 120 carbon black is available from the Cabot Corporation. The particle size of MONARCH 120 is about 60 nm and the size of the dispersed aggregate is 150-200 nm. MONARCH 120 has a tint strength of 55 tint units, as measured by ASTM D3265-11.

The ENCOR 627 aqueous binder emulsion was added to a suitable sized beaker that was being stirred with an overhead driven Cowles mixing blade set on low speed. The DYNOL 604, POLYPHASE P20T, MERGAL 192, propylene glycol butyl ether, TEXANOL and MONARCH 120 were then added sequentially, while stirring on low speed. Following this, the W210 ceramic microspheres were slowly added with the mixer initially set on low speed. As the viscosity of the mixture built upon addition of the ceramic microspheres, the mixer speed was increased. After addition was complete, mixing of this pre-mix was continued for approximately 5 minutes. The premix was then used without delay in the following step: The glass bubble filler was added to the mixing bowl of the low shear mixer. The premix was then added to the mixer by aid of a rubber spatula and the mixer was covered with a plastic or aluminum film to contain the very low density glass bubbles that tend to be stirred out of the bowl without a physical means to contain them. After providing this containment, the mixer was started on low speed very briefly multiple times until virtually all the glass bubbles were wet with the premix mixture. At that point the plastic or aluminum film could be removed from the bowl. At this point the mixer speed was increased to medium for approximately two minutes, then to high for approximately one minute. The mixer was then stopped and the batch was inspected. Water was added as needed to provide the desired consistency of the product. A skilled operator can determine the amount of water to add while mixing at high speed by auscultation; if the viscosity is the correct range, the mixture will make a distinctive low pitched sound as air begins to be entrained in the mixture. The mixture was then transferred to a plastic bucket with a lid, for storage.

All components listed in Table 6 for Example 6 are in weight percent, of the wall repair compound as formulated. (ENCOR 627 is an aqueous emulsion comprising 50 percent total solids). The batch size was approximately 250 g.

TABLE 6

| Component | Weight Percent |
| --- | --- |
| ENCOR 627 Binder Emulsion | 46.92 |
| K-20 Glass Bubbles | 21.24 |
| Ceramic Microspheres | 13.05 |
| Titanium Dioxide | 11.58 |
| Propylene Glycol Butyl Ether | 0.16 |
| TEXANOL | 0.04 |
| POLYPHASE P20T | 0.35 |
| MERGAL 192 | 0.09 |
| Antifoam | 0.002 |
| Carbon Black | 0.006 |
| Water to adjust | 6.56 |

Example 7

A batch of wall repair compound was synthesized using 40% DOWANOL PnB by the following general methods. The following equipment was provided: a high shear mixer equipped with a Cowles Blade, and a low shear (Hobart) mixer. ENCOR Latex 627 (binder emulsion) was obtained from Arkema Coating Resins. The ENCOR 627 acrylic latex binder has a particle size of 0.10 microns, a minimum film forming temperature of 9° C., and a glass transition temperature of 15° C. K-20 Glass bubbles were obtained from 3M Company. K-20 Glass bubbles were obtained from 3M Company. W210 Ceramic Microspheres were obtained from 3M Company. Titanium dioxide (TI-PURE R700), was obtained from DuPont Chemicals, Wilmington, Del. POLYPHASE P20T and MERGAL 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation DOWANOL PnB). TEXANOL Ester Alcohol (2,2,4-Trimethyl-1,3-pentanediol-mono(2-methylpropanoate)), CAS Number 25265-77-4, was obtained from the Eastman Chemical Company, Kingsport, Tenn. DYNOL 604 antifoam is available from Air Products. MONARCH 120 carbon black is available from the Cabot Corporation. The particle size of MONARCH 120 is about 60 nm and the size of the dispersed aggregate is 150-200 nm. MONARCH 120 has a tint strength of 55 tint units, as measured by ASTM D3265-11.

The ENCOR 627 aqueous binder emulsion was added to a suitable sized beaker that was being stirred with an overhead driven Cowles mixing blade set on low speed. The DYNOL 604, POLYPHASE P20T, MERGAL 192, propylene glycol butyl ether, TEXANOL and MONARCH 120 were then added sequentially, while stirring on low speed. Following this, the W210 ceramic microspheres were slowly added with the mixer initially set on low speed. As the viscosity of the mixture built upon addition of the ceramic microspheres, the mixer speed was increased. After addition was complete, mixing of this pre-mix was continued for approximately 5 minutes. The premix was then used without delay in the following step: The glass bubble filler was added to the mixing bowl of the low shear mixer. The premix was then added to the mixer by aid of a rubber spatula and the mixer was covered with a plastic or aluminum film to contain the very low density glass bubbles that tend to be stirred out of the bowl without a physical means to contain them. After providing this containment, the mixer was started on low speed very briefly multiple times until virtually all the glass bubbles were wet with the premix mixture. At that point the plastic or aluminum film could be removed from the bowl. At this point the mixer speed was increased to medium for approximately two minutes, then to high for approximately one minute. The mixer was then stopped and the batch was inspected. Water was added as needed to provide the desired consistency of the product. A skilled operator can determine the amount of water to add while mixing at high speed by auscultation; if the viscosity is the correct range, the mixture will make a distinctive low pitched sound as air begins to be entrained in the mixture. The mixture was then transferred to a plastic bucket with a lid, for storage.

All components listed in Table 7 for Example 7 are in weight percent, of the wall repair compound as formulated. (ENCOR 627 is an aqueous emulsion comprising 50 percent total solids). The batch size was approximately 250 g.

TABLE 7

| Component | Weight Percent |
| --- | --- |
| ENCOR 627 Binder Emulsion | 46.74 |
| K-20 Glass Bubbles | 21.16 |
| Ceramic Microspheres | 13.00 |
| Titanium Dioxide | 11.54 |
| Propylene Glycol Butyl Ether | 0.12 |

TABLE 7-continued

| Component | Weight Percent |
| --- | --- |
| TEXANOL | 0.08 |
| POLYPHASE P20T | 0.35 |
| MERGAL 192 | 0.09 |
| Antifoam | 0.002 |
| Carbon Black | 0.006 |
| Water to adjust | 6.92 |

Comparative Example C1

A batch of wall repair compound was synthesized by the following general methods. The following equipment was provided: a high shear mixer equipped with a Cowles Blade, and a low shear (Hobart) mixer. ENCOR 626 (100% acrylic latex) was obtained from Arkema Coating Resins. The ENCOR 626 latex binder has a particle size of 0.20 microns, a minimum film forming temperature of 20° C., and a glass transition temperature of 29° C. K-20 Glass bubbles were obtained from 3M Company. W210 Ceramic Microspheres were obtained from 3M Company. POLYPHASE P20T and MERGAL 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation DOWANOL PnB).

The ENCOR 626 aqueous binder emulsion was added to a suitable sized beaker that was being stirred with an overhead driven Cowles mixing blade set on low speed. The POLYPHASE P20T, MERGAL 192, and propylene glycol butyl ether were then added sequentially, while stirring on low speed. Following this, the W210 ceramic microspheres were slowly added with the mixer initially set on low speed. As the viscosity of the mixture built upon addition of the ceramic microspheres, the mixer speed was increased. After addition was complete, mixing of this pre-mix was continued for approximately 5 minutes. The premix was then used without delay in the following step: The glass bubble filler was added to the mixing bowl of the low shear mixer. The premix was then added to the mixer by aid of a rubber spatula and the mixer was covered with a plastic or aluminum film to contain the very low density glass bubbles that tend to be stirred out of the bowl without a physical means to contain them. After providing this containment, the mixer was started on low speed very briefly multiple times until virtually all the glass bubbles were wet with the premix mixture. At that point the plastic or aluminum film could be removed from the bowl. At this point the mixer speed was increased to medium for approximately two minutes, then to high for approximately one minute. The mixer was then stopped and the batch was inspected. Water was added as needed to provide the desired consistency of the product. A skilled operator can determine the amount of water to add while mixing at high speed by auscultation; if the viscosity is the correct range, the mixture will make a distinctive low pitched sound as air begins to be entrained in the mixture. The mixture was then transferred to a plastic bucket with a lid, for storage.

All components listed in Table 8 for Comparative Example 1 are in weight percent, of the wall repair compound as formulated. (ENCOR 626 is an aqueous emulsion comprising 50 percent total solids). The batch size was approximately 1.7 kg.

TABLE 8

| Component | Weight Percent |
| --- | --- |
| ENCOR 626 Binder Emulsion | 56.07 |
| K-20 Glass Bubbles | 25.38 |
| Ceramic Microspheres | 15.60 |
| Propylene Glycol Butyl Ether | 0.24 |
| POLYPHASE P20T | 0.41 |
| MERGAL 192 | 0.11 |
| Water to adjust | 2.19 |

Comparative Example C2

A batch of wall repair compound was synthesized by the following general methods. The following equipment was provided: a high shear mixer equipped with a Cowles Blade, and a low shear (Hobart) mixer. CELVOLIT 1774, (binder emulsion) was obtained from Celanese Emulsions. CELVOLIT 1774 is a vinyl acetate/ethylene (VAE) emulsion having a particle size of 0.20 microns, a minimum film forming temperature of 0° C., and a glass transition temperature of 12° C. K-20 Glass bubbles were obtained from 3M Company. W210 Ceramic Microspheres were obtained from 3M Company. Titanium dioxide (TI-PURE R700), was obtained from DuPont Chemicals, Wilmington, Del. POLYPHASE P20T and MERGAL 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation DOWANOL PnB).

The CELVOLIT 1774 aqueous binder emulsion was added to a suitable sized beaker that was being stirred with an overhead driven Cowles mixing blade set on low speed. The POLYPHASE P20T, MERGAL 192, and propylene glycol butyl ether were then added sequentially, while stirring on low speed. Following this, the W210 ceramic microspheres were slowly added with the mixer initially set on low speed. As the viscosity of the mixture built upon addition of the ceramic microspheres, the mixer speed was increased. The subsequent addition of the titanium dioxide likewise required additional mixer speed adjustment. After addition was complete, mixing of this pre-mix was continued for approximately 5 minutes. The premix was then used without delay in the following step: The glass bubble filler was added to the mixing bowl of the low shear mixer. The premix was then added to the mixer by aid of a rubber spatula and the mixer was covered with a plastic or aluminum film to contain the very low density glass bubbles that tend to be stirred out of the bowl without a physical means to contain them. After providing this containment, the mixer was started on low speed very briefly multiple times until virtually all the glass bubbles were wet with the premix mixture. At that point the plastic or aluminum film could be removed from the bowl. The mixer speed was increased to medium for approximately two minutes, then to high for approximately one minute. The mixer was then stopped and the batch was inspected. Water was added as needed to provide the desired consistency of the product. A skilled operator can determine the amount of water to add while mixing at high speed by auscultation; if the viscosity is the correct range, the mixture will make a distinctive low pitched sound as air begins to be entrained in the mixture. The mixture was then transferred to a plastic bucket with a lid, for storage.

All components listed in Table 9 for Comparative Example 2 are in weight percent, of the wall repair compound as formulated. (CELVOLIT 1774 is an aqueous emulsion comprising 55 percent total solids). The batch size was approximately 0.5 kg.

TABLE 9

| Component | Weight Percent |
| --- | --- |
| CELVOLIT 1774 Binder Emulsion | 46.34 |
| K-20 Glass Bubbles | 20.98 |
| Ceramic Microspheres | 7.63 |
| Titanium Dioxide | 11.44 |
| Propylene Glycol Butyl Ether | 0.20 |
| POLYPHASE P20T | 0.34 |
| MERGAL 192 | 0.09 |
| Water to adjust | 12.97 |

Comparative Example C3

A batch of wall repair compound was synthesized by the following general methods. The following equipment was provided: a high shear mixer equipped with a Cowles Blade, and a low shear (Hobart) mixer. RESYN 7480, (binder emulsion) was obtained from Celanese Emulsions. RESYN 7480 is a high molecular weight vinyl acrylic emulsion (vinyl acetate/acrylate) having a particle size of 0.275 microns, a minimum film forming temperature of 8° C., and a glass transition temperature of 18° C. K-20 Glass bubbles were obtained from 3M Company. W210 Ceramic Microspheres were obtained from 3M Company. Titanium dioxide (TI-PURE R700), was obtained from DuPont Chemicals, Wilmington, Del. POLYPHASE P20T and MERGAL 192 biocides were obtained from Troy Corporation. Propylene glycol butyl ether (CAS Number 5131-66-8) was obtained from Sigma-Aldrich, St. Louis, Mo., under the product number 484415 (and is believed to be substantially equivalent to the product obtainable from Dow Chemical under the trade designation DOWANOL PnB).

The RESYN 7480 aqueous binder emulsion was added to a suitable sized beaker that was being stirred with an overhead driven Cowles mixing blade set on low speed. The POLYPHASE P20T, MERGAL 192, and propylene glycol butyl ether were then added sequentially, while stirring on low speed. Following this, the W210 ceramic microspheres were slowly added with the mixer initially set on low speed. As the viscosity of the mixture built upon addition of the ceramic microspheres, the mixer speed was increased. The subsequent addition of the titanium dioxide likewise required additional mixer speed adjustment. After addition was complete, mixing of this pre-mix was continued for approximately 5 minutes. The premix was then used without delay in the following step: The glass bubble filler was added to the mixing bowl of the low shear mixer. The premix was then added to the mixer by aid of a rubber spatula and the mixer was covered with a plastic or aluminum film to contain the very low density glass bubbles that tend to be stirred out of the bowl without a physical means to contain them. After providing this containment, the mixer was started on low speed very briefly multiple times until virtually all the glass bubbles were wet with the premix mixture. At that point the plastic or aluminum film could be removed from the bowl. The mixer speed was increased to medium for approximately two minutes, then to high for approximately one minute. The mixer was then stopped and the batch was inspected. Water was added as needed to provide the desired consistency of the product. A skilled operator can determine the amount of water to add while mixing at high speed by auscultation; if the viscosity is the correct range, the mixture will make a distinctive low pitched sound as air begins to be entrained in the mixture. The mixture was then transferred to a plastic bucket with a lid, for storage.

All components listed in Table 10 for Comparative Example 3 are in weight percent, of the wall repair compound as formulated. (RESYN 7480 is an aqueous emulsion comprising 55 percent total solids). The batch size was approximately 0.5 kg.

TABLE 10

| Component | Weight Percent |
| --- | --- |
| RESYN 7480 Binder Emulsion | 46.09 |
| K-20 Glass Bubbles | 20.86 |
| Ceramic Microspheres | 7.59 |
| Titanium Dioxide | 11.38 |
| Propylene Glycol Butyl Ether | 0.20 |
| POLYPHASE P20T | 0.34 |
| MERGAL 192 | 0.09 |
| Water to adjust | 13.47 |

The Examples and Comparative Example spackle compounds were tested for Hardness, Gloss Retention, Paint Anchorage, and Hiding Power Comparison, as described in the above test methods. Results are reported in Tables 11-14.

TABLE 11

| Example | Shore OO Hardness - Initial Reading | Shore OO Hardness - Second reading (after 60 Sec) |
| --- | --- | --- |
| 1 | 96 | 91 |
| 2 | 95 | 91 |
| 3 | 96 | 90 |
| 4 | 95 | 89 |
| 5 | 96 | 93 |
| 6 | 96 | 93 |
| 7 | 97 | 93 |
| C1 | 98 | 97 |
| C2 | 92 | 89 |
| C3 | 93 | 93 |

TABLE 12

| Example | 85 Deg Gloss Reading | Gloss Retention Index |
| --- | --- | --- |
| Control 1 (painted, primed drywall board | 5.5 | NA |
| 1 | 3.5 | .64 |
| Control 2 (painted, primed drywall board | 10.2 | NA |
| 2 | 4.1 | .40 |
| 3 | 6.1 | .60 |
| 4 | 3.8 | .37 |
| Control 3 (painted, primed drywall board | 11.5 | NA |
| 5 | 6.0 | .52 |
| 6 | 5.9 | .51 |
| 7 | 6.6 | .57 |
| C1 | 1.6 | .29 |
| C2 | 0.9 | .16 |
| C3 | 1.5 | .27 |

Note:
Control 1 was used to calculate the Gloss Retention Index value for Examples 1 and C1-C3.
Control 2 was used to calculate the Gloss Retention Index values for Examples 2-4.
Control 3 was used to calculate the Gloss Retention Index values for Examples 5-7.

TABLE 13

| Example | Paint Anchorage (Pass/Fail) |
| --- | --- |
| 1 | Pass |
| 2 | Pass |
| 3 | Pass |
| 4 | Pass |
| 5 | Pass |
| 6 | Pass |
| 7 | Pass |
| C1 | Pass |
| C2 | Fail |
| C3 | Fail |

TABLE 14

| Example | Hiding Power Comparison (Pass/Fail) |
| --- | --- |
| 1 | Pass |
| 2 | Fail |
| 3 | Fail |
| 4 | Pass |
| 5 | Pass |
| 6 | Pass |
| 7 | Pass |
| C1 | Fail |
| C2 | Pass |
| C3 | Pass |

Persons of ordinary skill in the art may appreciate that various changes and modifications may be made to the invention described above without deviating from the inventive concept. Thus, the scope of the present invention should not be limited to the structures described in this application, but only by the structures described by the language of the claims and the equivalents of those structures.

What is claimed is:

1. A spackling compound, comprising:
   (a) between about 35% by weight and about 65% by weight acrylic latex resin;
   (b) between about 20% by weight and about 50% by weight filler material; and
   (c) between about 1% by weight and about 20% by weight water;
   wherein the acrylic latex resin has an average latex particle size of less than about 0.18 microns.

2. A spackling compound as defined in claim 1, wherein the resin has a minimum film formation temperature of less than about 15 degrees Celsius.

3. A spackling compound as defined in claim 1, wherein the resin has a glass transition temperature (Tg) of less than about 25 degrees Celsius.

4. A spackling compound as defined in claim 1, further comprising at least one colorant.

5. A spackling compound as defined in claim 4, wherein the dried spackling compound passes the 6 mil hide test set forth in the specification.

6. A spackling compound as defined in claim 5, wherein the spackling compound comprises between about 2% by weight and about 20% by weight colorant.

7. A spackling compound as defined in claim 6, wherein the colorant comprises titanium dioxide.

8. A spackling compound as defined in claim 7, wherein the colorant further comprises carbon black.

9. A spackling compound as defined in claim 8, wherein the carbon black comprises less than about 0.02 percent by weight of the spackling compound.

10. A spackling compound as defined in claim 1, wherein the spackling compound further comprises a coalescing aid.

11. A spackling compound as defined in claim 1, wherein the coalescing aid comprises trimethylpentanediol monoisobutyrate.

12. A spackling compound as defined in claim 1, wherein the coalescing aid comprises less than about 1% by weight propylene glycol.

13. A spackling compound as defined in claim 1, wherein the spackling compound further comprises a dispersing agent.

14. A spackling compound as defined in claim 1, wherein the dispersing agent comprises less than about 1 percent by weight of a sodium salt of polymeric carboxylic acid.

15. A spackling compound as defined in claim 1, wherein the spackling compound further comprises a lubricant.

16. A spackling compound as defined in claim 1, wherein the lubricant comprises less than about 1% by weight hydroxy ethyl cellulose.

17. A spackling compound as defined in claim 1, wherein the filler comprises a bimodal distribution of particles.

18. A spackling compound as defined in claim 1, wherein the bimodal distribution of particles comprises at least one of glass bubbles and ceramic microspheres.

19. A spackling compound as defined in claim 1, wherein the filler is substantially free of mined organic filler materials.

20. A spackling compound as defined in claim 1, wherein the dried spackling compound has an average 85 degree gloss retention index of at least about 0.3 when testing according to the method set forth in the specification.

21. A spackling compound, comprising:
  (a) between about 45% by weight and about 60% by weight acrylic latex resin;
  (b) between about 25% by weight and about 45% by weight filler material;
  (c) between about 5% by weight and about 15% by weight titanium dioxide; and
  (d) between about 1% by weight and about 15% by weight water;

wherein the latex resin has an average latex particle size of less than about 0.18 microns, a minimum film formation temperature of less than about 15 degrees Celsius, and a glass transition temperature (Tg) of less than about 25 degrees Celsius.

22. A spackling compound as defined in claim 21, wherein the dried spackling compound passes the 6 mil hide test defined in the specification, and further wherein the dried spackling compound has an average 85 degree gloss retention index of at least about 0.4 when testing according to the method set forth in the specification.

* * * * *